US008711941B2

(12) United States Patent (10) Patent No.: US 8,711,941 B2
Letunovskiy et al. (45) Date of Patent: Apr. 29, 2014

(54) MOTION ESTIMATION FOR A VIDEO TRANSCODER

(75) Inventors: Aleksey Alexandrovich Letunovskiy, Tokarevka (RU); Alexander Markovic, Media, PA (US); Ivan Leonidovich Mazurenko, Khimki (RU); Denis Vassilevich Parfenov, Moscow (RU); Alexander Alexandrovich Petyushko, Bryansk (RU)

(73) Assignee: LSI Corporation, San Jose, CA (US)

( * ) Notice: Subject to any disclaimer, the term of this patent is extended or adjusted under 35 U.S.C. 154(b) by 363 days.

(21) Appl. No.: 13/165,056

(22) Filed: Jun. 21, 2011

(65) Prior Publication Data

US 2012/0106642 A1 May 3, 2012

(30) Foreign Application Priority Data

Oct. 29, 2010 (RU) ................................ 2010144450

(51) Int. Cl.
*H04N 7/12* (2006.01)
*H04N 11/02* (2006.01)
*G06K 9/32* (2006.01)

(52) U.S. Cl.
USPC ..................................... 375/240.16; 382/299

(58) Field of Classification Search
USPC ......................................... 382/299; 375/240
See application file for complete search history.

(56) References Cited

U.S. PATENT DOCUMENTS 6,825,885 B2 11/2004 Bottreau et al.
6,891,891 B2 5/2005 Pau et al.
6,925,123 B2 8/2005 Subramaniyan et al.
7,023,921 B2 4/2006 Subramaniyan et al.
7,280,708 B2 * 10/2007 Song et al. .................... 382/299
7,616,692 B2 11/2009 Holcomb et al.
7,623,574 B2 11/2009 Holcomb (Continued)

FOREIGN PATENT DOCUMENTS

JP 2005101811 A * 4/2005 ............. H04N 7/32
WO WO02/32145 A1 4/2002

OTHER PUBLICATIONS

Hanson et al., "H.264 video encoder motion search implementation on a programmable accelerator", http://www.eetimes.com/document.asp?doc_id=1273727, EE Times, May 18, 2007, pp. 1-2.*

(Continued)

*Primary Examiner* — Sath V. Perungavoor
*Assistant Examiner* — Xiaolan Xu
(74) *Attorney, Agent, or Firm* — Mendelsohn, Drucker & Dunleavy, P.C.; Yuri Gruzdkov; Steve Mendelsohn (57) ABSTRACT

A video transcoder for converting an encoded input video bit-stream having one spatial resolution into an encoded output video bit-stream having a lower spatial resolution, wherein motion-vector dispersion observed at the higher spatial resolution is quantified and used to configure the motion-vector search at the lower spatial resolution. For example, for video-frame areas characterized by relatively low motion-vector dispersion values, the motion-vector search may be performed over a relatively small vector space and with the use of fewer search patterns and/or hierarchical search levels. These constraints enable the transcoder to find appropriate motion vectors for inter-prediction coding without having to perform an exhaustive motion-vector search for these video-frame areas, which advantageously reduces the computational complexity and processor load compared to those of a comparably performing prior-art video transcoder.

21 Claims, 7 Drawing Sheets

(56) References Cited

U.S. PATENT DOCUMENTS

| | | | |
|---|---|---|---|
| 7,680,186 B2 | 3/2010 | Lee et al. | |
| 7,693,218 B2 | 4/2010 | Hubrich et al. | |
| 7,733,960 B2 | 6/2010 | Kondo et al. | |
| 7,782,951 B2 | 8/2010 | Muthukrishnan et al. | |
| 2006/0133500 A1 | 6/2006 | Lee et al. | |
| 2007/0274390 A1* | 11/2007 | Tsai et al. | 375/240.16 |
| 2010/0020886 A1* | 1/2010 | Raveendran et al. | 375/240.27 |
| 2013/0022118 A1* | 1/2013 | Kim et al. | 375/240.16 |

OTHER PUBLICATIONS

Zhang, Li et al., "Hybrid Algorithm with Adaptive Complexity for Integer Pel Motion Estimation of H.264," IEEE International Conference on Multimedia and Expo (ICME), 2005, pp. 101-104.

Tourapis, Alexis M., "Enhanced Predictive Zonal Search for Single and Multiple Frame Motion Estimation," XiWave plc, Bath, BA1 2PH, United Kingdom, 2002, (11 pages).

Zhu, Ce et al, "Hexagon-Based Search Pattern for Fast Block Motion Estimation," IEEE Transactions on Circuits and Systems for Video Technology, vol. 12, No. 5, May 2002, pp. 349-355.

Lin, Yih-Chuan et al., "Fast Full-Search Block-Matching Algorithm for Motion-Compensated Video Compression," IEEE Transactions on Communications, vol. 45, No. 5, May 1997, pp. 527-531.

Hu, Bo et al., "Reducing Spatial Resolution for MPEG-2 to H.264/AVC Transcoding," In Proceedings of PCM, 2005, pp. 830-840.

Tan, Yap-Peng et al., "On the Methods and Application of Arbitrarily Downsizing Video Transcoding," IEEE Signal Processing Letters, 2002, pp. 609-612.

Su, Yeping et al., "Fast Multiple Reference Frame Motion Estimation for H.264/AVC," IEEE Transactions on Circuits and Systems for Video Technology, 2006, pp. 447-452.

Dai, Jingjing et al., "Motion Vector Coding based on Predictor Selection and Boundary-Matching Estimation," IEEE International Workshop on Multimedia Signal Processing, 2009 (5 pages).

Lin, Shu-Fa et al., "Fast Multi-Frame Motion Estimation for H.264 and Its Applications to Complexity-Aware Streaming," IEEE International Symposium on Circuits and Systems, 2005, vol. 2, pp. 1505-1508.

"H.264/AVC Software Coordination," H.264/AVC JM 14.2 Reference Software Documentation, Retrieved from: <URL:http://iphome.hhi.de/suehring/tml/> (1 page).

* cited by examiner

| SUB-BLOCK TYPE | WEIGHTING COEFFICIENT |
|---|---|
| 8x16 | 0.5 |
| 16x8 | 0.5 |
| 8x8 | 0.25 |
| 4x8 | 0.125 |
| 8x4 | 0.125 |
| 4x4 | 0.0625 |

MOTION ESTIMATION FOR A VIDEO TRANSCODER

BACKGROUND

1. Field of the Invention

The present invention relates to video transcoding and, more specifically but not exclusively, to changing spatial resolution in encoded video bit-streams.

2. Description of the Related Art

This section introduces aspects that may help facilitate a better understanding of the invention(s). Accordingly, the statements of this section are to be read in this light and are not to be understood as admissions about what is in the prior art or what is not in the prior art.

Video transcoding is a process of converting a previously encoded video bit-stream into another encoded video bit-stream, e.g., with a different bit rate, a different frame rate, a different display format, and/or a different coding method. For example, video transcoding can be used to convert a video bit-stream encoded in one standard into a video bit-stream encoded in a different standard, with the initial and final standards selected from a set consisting of the H.26x and MPEG-z families of standards, where x=1, 3, 4 and z=1, 2, 4. Another important example of video transcoding is conversion of an encoded video bit-stream having one spatial resolution into an encoded video bit-stream having a different (typically lower) spatial resolution, without changing the standard. Other video-transcoding operations may include adding enhanced error resilience, inserting logos and watermarks, adjusting temporal resolution, etc. Video transcoding advantageously enables multimedia devices of diverse formats and capabilities to exchange video content on heterogeneous transport-network platforms, such as the Internet.

The H.26x and MPEG-z families of standards employ motion estimation to compress video data based on temporal redundancy present in successive frames. To achieve good video quality with a significant degree of compression, a video encoder typically performs an exhaustive search, during which the encoder attempts to find a block in a reference (past or future) frame that best matches a given block in the current frame, e.g., by maximizing a cross-correlation function or minimizing an error criterion. This search makes the motion-estimation algorithmic module one of the dominant components of a video transcoder in terms of computational complexity and processor load. It is therefore desirable to have a motion-estimation algorithm that can produce acceptable video quality while keeping the corresponding computational complexity and/or processor load at relatively low levels.

SUMMARY

Disclosed herein are various embodiments of a video transcoder for converting an encoded input video bit-stream having one spatial resolution into an encoded output video bit-stream having a lower spatial resolution, wherein motion-vector dispersion observed at the higher spatial resolution is quantified and used to configure the motion-vector search at the lower spatial resolution. For example, for video-frame areas characterized by relatively low motion-vector dispersion values, the motion-vector search may be performed over a relatively small vector space and with the use of fewer search patterns and/or hierarchical search levels. These constraints enable the transcoder to find appropriate motion vectors for inter-prediction coding without having to perform an exhaustive motion-vector search for these video-frame areas, which advantageously reduces the computational complexity and processor load compared to those of a comparably performing prior-art video transcoder.

According to one embodiment, provided is a method of resizing digital video having the steps of: converting a source area in a first video frame having a first spatial resolution into a macroblock in a corresponding second video frame having a second spatial resolution smaller than the first spatial resolution; calculating a dispersion metric for a set of motion vectors corresponding to the source area at the first spatial resolution; and performing a motion-vector search configured based on the dispersion metric to find a motion vector for the macroblock at the second spatial resolution.

According to another embodiment, provided is a video transcoder having a decoder adapted to decode an encoded video bit-stream to produce a first video frame having a first spatial resolution, and a downsizer adapted to convert the first video frame into a corresponding second video frame having a second spatial resolution smaller than the first spatial resolution. The downsizer converts a source area from the first video frame into a macroblock in the second video frame. The video transcoder further has an encoder adapted to apply inter-prediction coding to the macroblock. The encoder calculates a dispersion metric for a set of motion vectors corresponding to the source area at the first spatial resolution. The encoder then performs a motion-vector search configured based on the dispersion metric to find a motion vector for the macroblock at the second spatial resolution.

According to yet another embodiment, provided is a video transcoder having means for converting a source area in a first video frame having a first spatial resolution into a macroblock in a corresponding second video frame having a second spatial resolution smaller than the first spatial resolution; means for calculating a dispersion metric for a set of motion vectors corresponding to the source area at the first spatial resolution; and means for performing a motion-vector search configured based on the dispersion metric to find a motion vector for the macroblock at the second spatial resolution.

BRIEF DESCRIPTION OF THE DRAWINGS

Other aspects, features, and benefits of various embodiments of the invention will become more fully apparent, by way of example, from the following detailed description and the accompanying drawings, in which.

DETAILED DESCRIPTION

FIGS. 1A-1D show representative macroblock partitions that can be used in tree-structured motion estimation according to one embodiment of the invention. As used herein, the term "macroblock" refers to a 16×16 block of pixels. The numbers shown in FIGS. 1A-1D next to the sides of the corresponding macroblocks indicate the respective linear sizes of the macroblock partitions expressed in pixels.

Figure 1A:
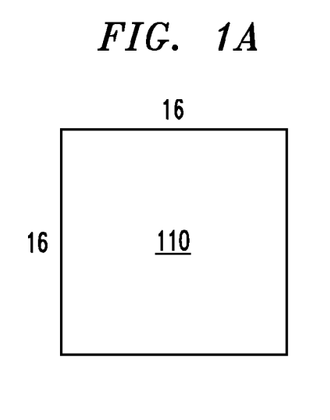
FIG. 1A-1D show representative macroblock partitions that can be used in tree-structured motion estimation according to one embodiment of the invention.
Figure 1B:
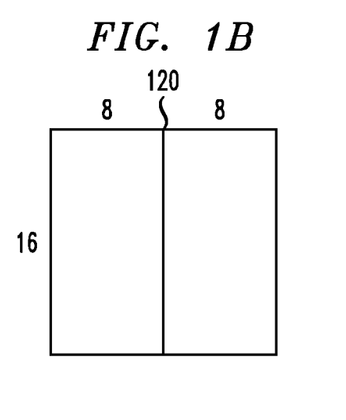
Figure 1C:
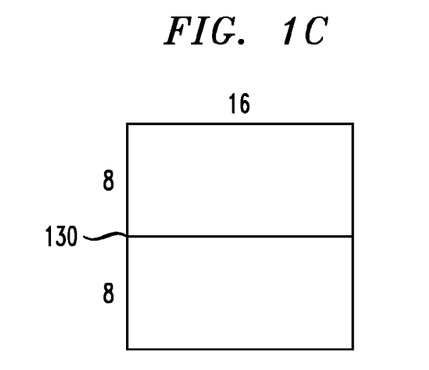

Depending on image characteristics in the video stream, motion estimation can be applied to a macroblock as a whole or individually to one or more sub-blocks of a macroblock. For example, macroblock 110 shown in FIG. 1A is not partitioned into sub-blocks. If macroblock 110 is inter-predicted, then a single motion vector may be used for the inter-prediction. In contrast, macroblock 120 shown in FIG. 1B is partitioned into two 8×16 sub-blocks, each of which can individually be inter-predicted. If macroblock 120 is inter-predicted, then two motion vectors, one motion vector per sub-block, may need to be used for the inter-prediction. Macroblock 130 shown in FIG. 1C is similarly partitioned into two 16×8 sub-blocks, each of which may be inter-predicted using a corresponding individual motion vector.

Figure 1D:
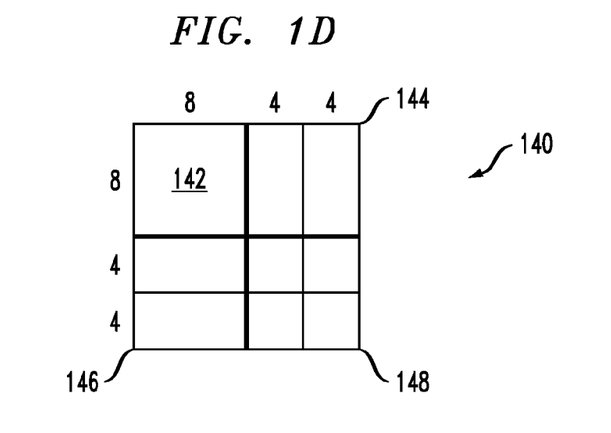

If a macroblock is partitioned into four 8×8 sub-blocks, then several inter-prediction options are available, as indicated in FIG. 1D using macroblock 140 as an example. One option is to individually inter-predict each of the four 8×8 sub-blocks, without partitioning them any further, e.g., as shown for an 8×8 sub-block 142. In this case, macroblock 140 can be inter-predicted using four motion vectors, one per 8×8 sub-block.

Another option is to partition one or more of the 8×8 sub-blocks using one or more of the following partition schemes: (1) partition an 8×8 sub-block into two 4×8 sub-blocks, e.g., as indicated in FIG. 1D for an 8×8 sub-block 144; (2) partition an 8×8 sub-block into two 8×4 sub-blocks, e.g., as indicated in FIG. 1D for an 8×8 sub-block 146; and (3) partition an 8×8 sub-block into four 4×4 sub-blocks, e.g., as indicated in FIG. 1D for an 8×8 sub-block 148. Depending on the particular partition-scheme combination, macroblock 140 may be inter-predicted using from five to sixteen individual motion vectors.

Each motion vector is encoded and transmitted via the corresponding encoded video bit-stream together with the information about the corresponding partition type. The use of larger partition sizes (e.g., 16×16, 16×8, and 8×16) usually means that a relatively small number of bits can be used to transmit the motion vectors and partition-type information. However, transmission of the corresponding motion-compensated residuals may require a relatively large number of bits, e.g., due to a significant amount of residual energy in macroblock areas with relatively fine image features. The use of smaller partition sizes (e.g., 8×8, 8×4, 4×8, and 4×4) usually means that a relatively large number of bits need to be used to transmit the motion vectors and partition-type information. However, transmission of the corresponding motion-compensated residuals may require a relatively small number of bits, e.g., due to better accuracy in the prediction of relatively fine image features. Due to this relationship between the degree of compression and partition sizes, some optimal overall partition scheme may have to be chosen to achieve a relatively high degree of compression.

Figure 2:
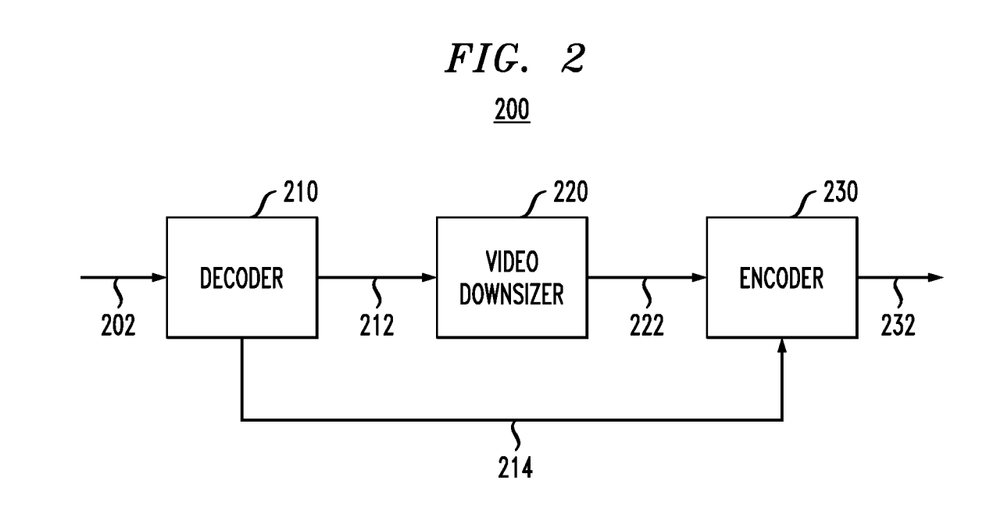
FIG. 2 shows a block diagram of a video transcoder according to one embodiment of the invention.

Color information may be encoded at a lower spatial resolution than the luminance information. For example, each chroma block size may be one half of the corresponding luma block size. Fractional-pixel resolution, e.g., one quarter or one eighth of a pixel, may be used for motion vector values. Since luma and chroma values are specified in the reference frame only at the integer-pixel positions, appropriate interpolation schemes may be invoked in motion estimation. Additional data compression for the video bit-stream can be achieved, for example, by (i) using motion-vector-prediction methods and (ii) transmitting difference motion vectors instead of the actual motion vectors. A difference motion vector is the difference between the predicted motion vector and the actual motion vector. A representative motion-vector-prediction method is described below in reference to FIG. 4B. Other useful motion-vector-prediction methods are disclosed, e.g., in U.S. Pat. Nos. 7,733,960, 7,693,218, 7,680,186, and 7,616,692, all of which are incorporated herein by reference in their entirety. FIG. 2 shows a block diagram of a video transcoder 200 according to one embodiment of the invention. Video transcoder 200 has a decoder 210, a video downsizer 220, and an encoder 230. An input video bit-stream 202 having a first (original) spatial resolution is applied to decoder 210. Decoder 210 decodes (partially or fully) input video bit-stream 202, e.g., as known in the art, to produce a decoded video bit-stream 212. Video downsizer 220 then processes bit-stream 212 to perform planar image-size transformation from the original size/resolution (e.g., Y1 by Y2 pixels) to a new second (target) size/resolution (e.g., Z1 by Z2 pixels), where Z1=k Y1, Z2=k Y2, and k is a scaling factor (SF). Typically, the scaling factor is between zero and one (0<k<1) and can be represented as a simple fraction, k=M/N, where M and N are positive integers.

A transformed video bit-stream 222 generated by video downsizer 220 is applied to encoder 230. Encoder 230 encodes video bit-stream 222 to generate an output video bit-stream 232 having the target spatial resolution. In the encoding process, encoder 230 uses information about the original-resolution motion vectors provided to it via a feed-forward signal 214 by decoder 210 as further described below in reference to FIGS. 3-4. In certain situations, this information enables encoder 230 to find motion vectors at the target resolution for video bit-stream 232 without performing a corresponding exhaustive search, which advantageously reduces the computational complexity and processor load for video transcoder 200 compared to those of a comparably performing prior-art video transcoder.

Additional information on the possible architecture and various embodiments of video transcoder 200 can be found, e.g., in commonly owned Russian Patent Application No. 2010135495, filed on Aug. 24, 2010, and entitled "VIDEO TRANSCODER WITH FLEXIBLE QUALITY AND COMPLEXITY MANAGEMENT," which is incorporated herein by reference in its entirety. Certain methods of the present invention can be implemented, e.g., in motion-estimation engine 256 shown in FIG. 2A of that patent application.

Figure 3A:
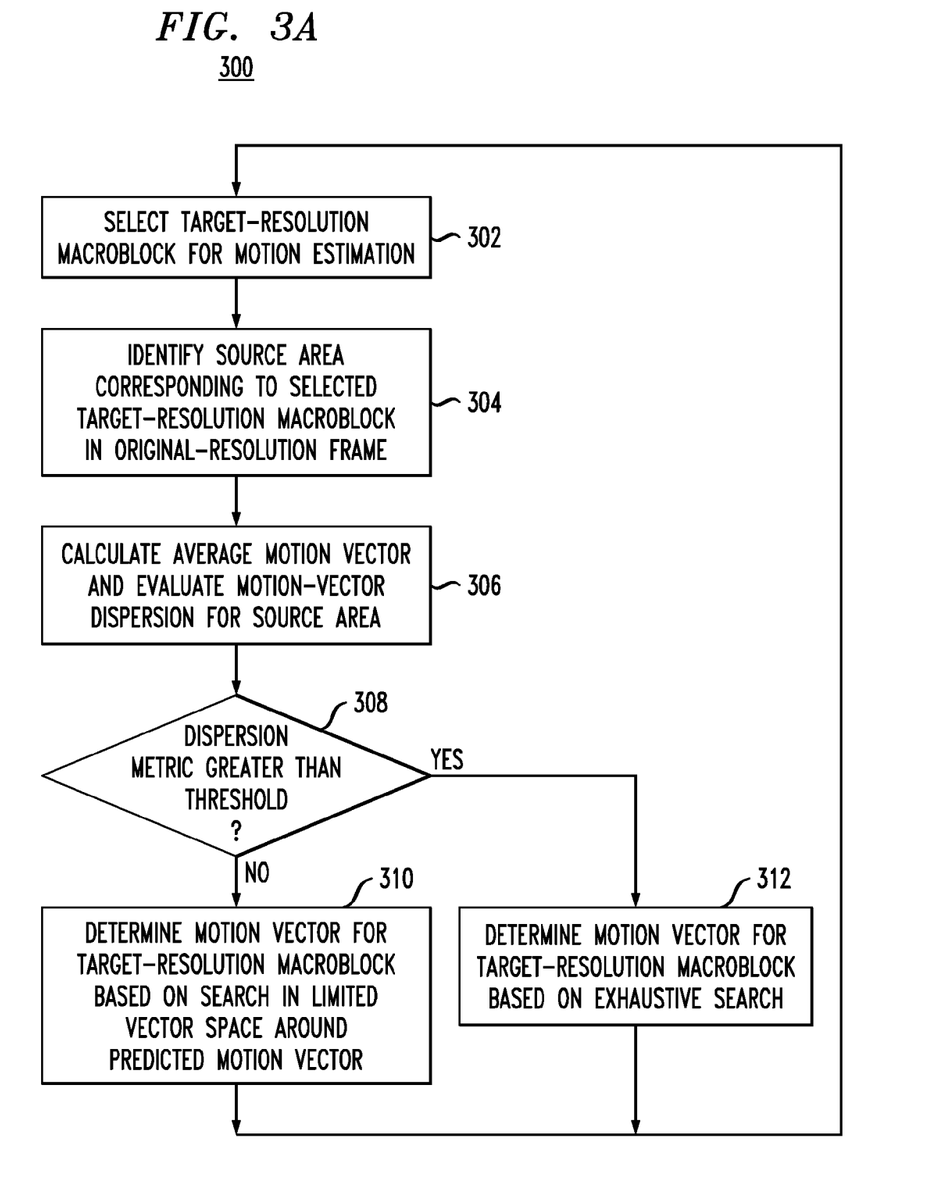
FIGS. 3A-3E illustrate a video-encoding method that can be used in the video transcoder of FIG. 2 according to one embodiment of the invention.
Figure 3B:
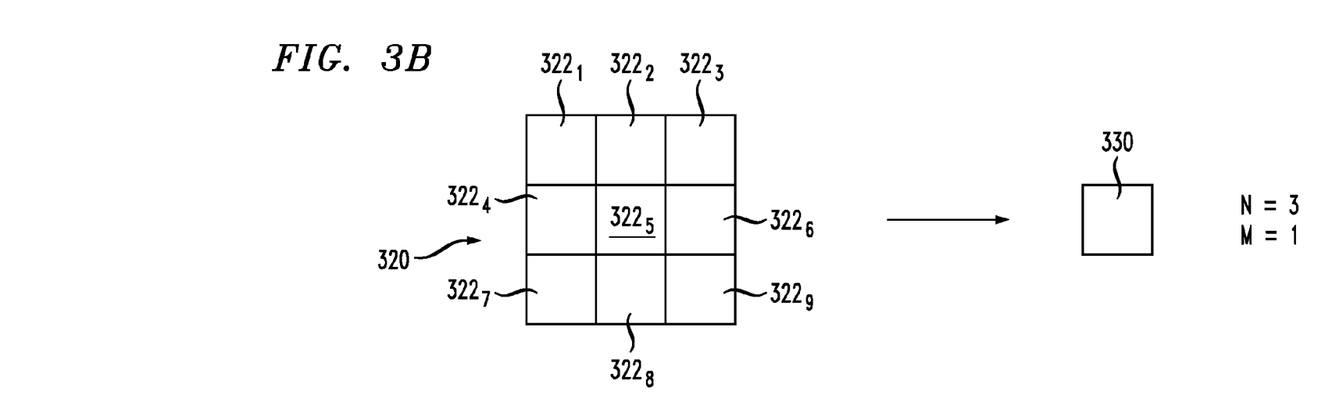
Figure 3C:
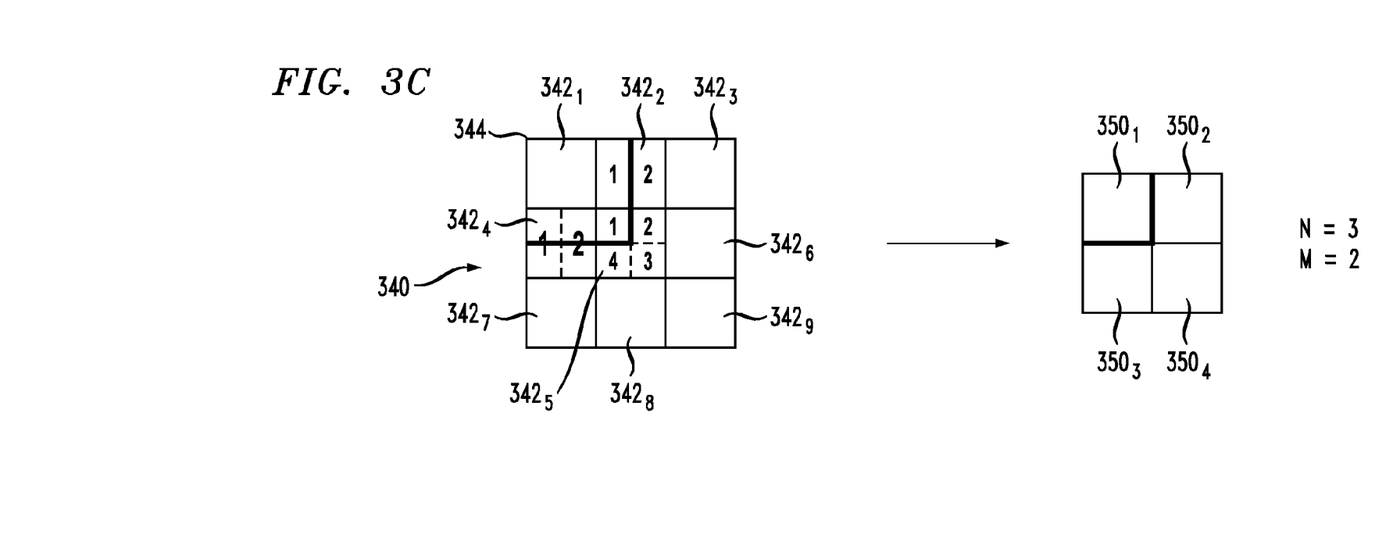
Figure 3D:
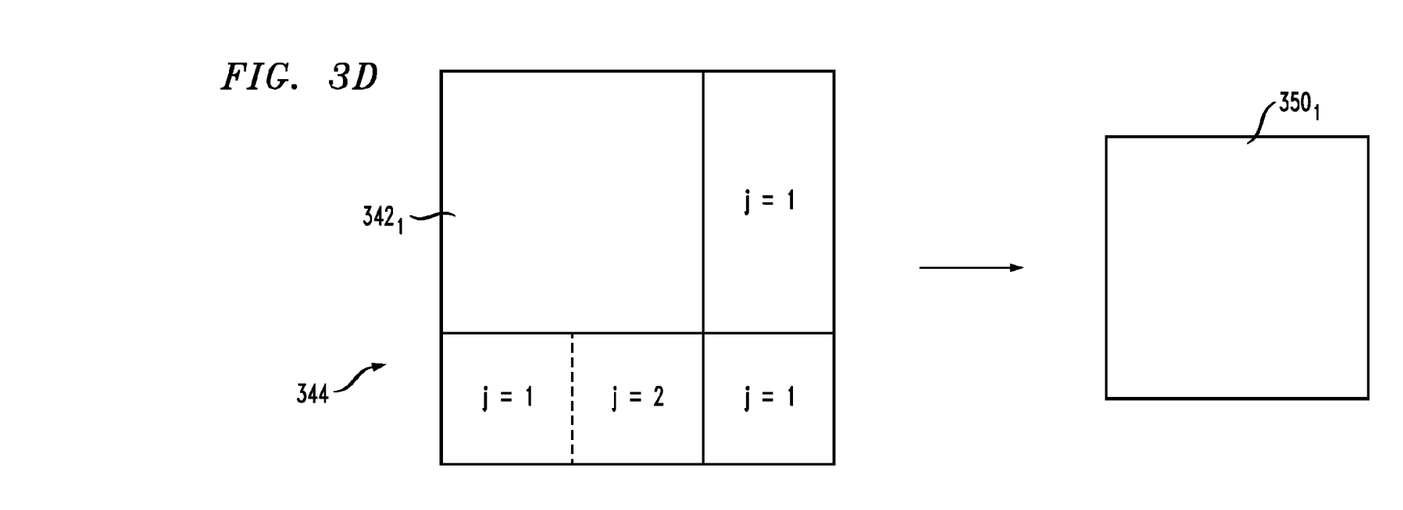
Figure 3E:
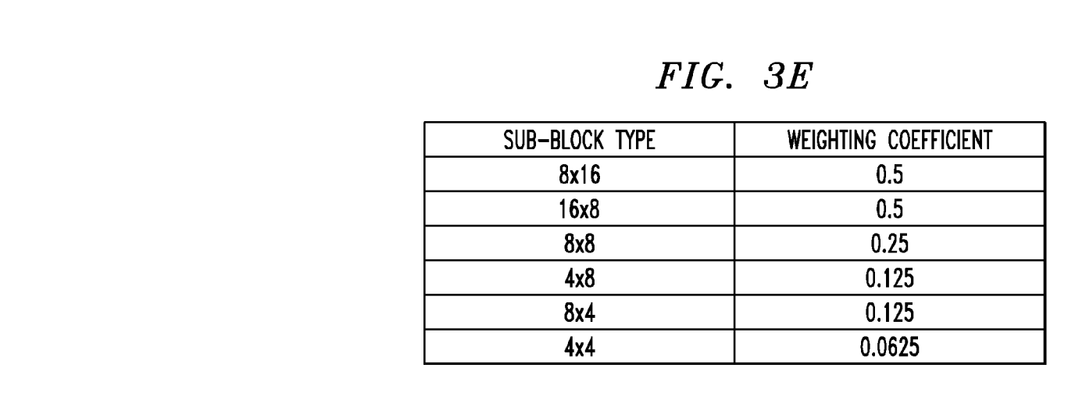

FIGS. 3A-3E illustrate a video-encoding method 300 that can be used in encoder 230 (FIG. 2) according to one embodiment of the invention. More specifically, FIG. 3A shows a flowchart of method 300. FIG. 3B illustrates an exemplary transcoding configuration for method 300 in which a group of nine macroblocks from an original-resolution frame is converted into one macroblock in a corresponding target-resolution frame (i.e., M=1; N=3; and k=⅓). FIGS. 3C-3D illustrate another exemplary transcoding configuration for method 300 in which a group of nine macroblocks from an original-resolution frame is converted into four macroblocks in a corresponding target-resolution frame (i.e., M=2; N=3; and k=⅔). FIG. 3E shows a representative set of weighting coefficients that can be used in method 300.

At step 302 of method 300, a macroblock in a target-resolution frame is selected for motion estimation. Macroblocks can be selected in any desired order, e.g., consecutively, starting from the upper left corner of the frame and going in a zigzag pattern toward the lower right or left corner of the frame (depending on whether there is an odd or even number of rows of macroblocks in the frame). It is assumed here that the selected macroblock lends itself to motion-vector prediction, e.g., because it has appropriate adjacent inter-predicted blocks.

At step 304, the source area corresponding to the macroblock selected at step 302 is identified in the original-resolution frame. FIGS. 3B-3D illustrate two different transcoding configurations that may be encountered at step 304.

FIG. 3B shows a transcoding configuration in which a target-resolution macroblock 330 is generated from nine whole original-resolution macroblocks $322_1$-$322_9$ of source area 320. This type of transcoding configuration usually corresponds to M=1.

FIGS. 3C-3D show an alternative transcoding configuration in which a target-resolution macroblock $350_1$ is generated from one whole original-resolution macroblock $342_1$ and several portions of original-resolution macroblocks $342_2$, $342_4$, and $342_5$ of a macroblock group 340. The thick solid line in FIG. 3C indicates source area 344 within macroblock group 340 that corresponds to target-resolution macroblock $350_1$. More specifically, source area 344 consists of the whole macroblock $342_1$, the pixels of the left 8×16 portion of macroblock $342_2$, the pixels of the top 16×8 portion of macroblock $342_4$, and the pixels of the upper left 8×8 portion of macroblock $342_5$. An enlarged view of source area 344 is also shown in FIG. 3D. Each of target-resolution macroblocks $350_2$-$350_4$ has respective source areas in macroblock group 340 that are qualitatively similar to source area 344. In general, depending on the selected M and N values, the original-resolution source area corresponding to a target-resolution macroblock may consist of any combination of whole macroblocks, macroblock portions, whole sub-blocks, and/or sub-block portions.

At step 306, motion-vector dispersion is evaluated for the source area identified at step 304. Motion-vector dispersion is a quantity that characterizes a set of motion vectors in terms of the width of their distribution around the average motion vector (A) corresponding to the set. In the description of step 306 that follows, the calculations of average motion vector A for different transcoding configurations are explained first. Then, the calculation of a representative motion-vector-dispersion metric (D) is described. One skilled in the art will appreciate that other suitable dispersion metrics that differ from dispersion metric D can also be used in alternative implementations of step 306.

Referring to FIG. 3B and assuming first that each of macroblocks $322_1$-$322_9$ is inter-predicted using a single respective motion vector $V_i$, average motion vector A for source area 320 can be calculated using Eq. (1):

$$A = \frac{1}{N^2} \sum_{i=1}^{N^2} V_i \qquad (1)$$

where N=3. Note that Eq. (1) is also valid for other N values in transcoding configurations with M=1.

If original-resolution macroblock 322 in source area 320 is inter-predicted using two or more motion vectors corresponding to two or more sub-blocks of that macroblock (see FIGS. 1B-1D), then Eq. (1) is modified by replacing motion vector $V_i$ with effective motion vector $\tilde{V}_i$ expressed by Eq. (2):

$$\tilde{V}_i = \sum_j w_j v_{ij} \qquad (2)$$

where $v_{ij}$ is the motion vector corresponding to the j-th sub-block of the i-th macroblock, and $w_j$ is the weighting coefficient corresponding to the j-th sub-block. A representative set of weighting coefficients w that can be used in Eq. (2) is shown in FIG. 3E. Note that the calculation of effective motion vector $\tilde{V}_i$ with the use of these weighting coefficients is, in effect, motion-vector averaging performed over the total area of the i-th macroblock.

Referring to FIGS. 3C-3D, let us suppose, for illustration purposes, that macroblocks $342_1$, $342_2$, $342_4$, and $342_5$ of macroblock group 340 are inter-predicted using one, two, two, and four motion vectors, respectively. The corresponding sub-blocks of these macroblocks are indicated in FIG. 3C. Then, inspection of, for example, macroblock $342_4$ reveals that the boundaries of the sub-blocks used for the inter-prediction of that macroblock do not line up with the boundary of source area 344.

In a situation that is qualitatively similar to that indicated in FIG. 3C for source area 344, Eq. (1) can be replaced by Eq. (3):

$$A = \frac{M^2}{N^2} \sum_{i,j} f_{ij} w_{ij} v_{ij} \qquad (3)$$

where i is the index that labels the implicated original-resolution macroblocks; $v_{ij}$ is the motion vector corresponding to the j-th sub-block of the i-th macroblock; $w_{ij}$ is the weighting coefficient corresponding to the j-th sub-block of the i-th macroblock; and $f_{ij}$ expresses the fraction of the total area of the j-th sub-block of the i-th macroblock that overlaps with the source area.

For example, for source area 344, the summation of Eq. (3) is performed over i-index values of i=1, 2, 4, 5. The set of weighting coefficients shown in FIG. 3E can be used in Eq. (3) without changes, in a manner similar to that of Eq. (2). Fractions $f_{ij}$ have the following values. For macroblock $342_1$ (i.e., for i=1), all $f_{ij}$=1 because 100% of the area of macroblock $342_1$ any of its constituent sub-blocks (not explicitly shown in FIGS. 3C-3D) overlaps with source area 344. For macroblock $342_2$ (i.e., for i=2), there are two 8×16 sub-blocks. Suppose that the left and right 8×16 sub-blocks are assigned j-index values of j=1 and j=2, respectively, as indicated in FIG. 3C. Then, $f_{21}$=1 because 100% of the area of the left 8×16 sub-block in macroblock $342_2$ overlaps with source area 344; and $f_{22}$=0 because the right 8×16 sub-block in macroblock $342_2$ does not overlap with source area 344. For macroblock $342_4$ (i.e., for i=4), there are also two 8×16 sub-blocks. Suppose again that the left and right 8×16 sub-blocks are assigned j-index values of j=1 and j=2, respectively. Then, $f_{41}$=0.5 because 50% of the area of the left 8×16 sub-block in macroblock $342_4$ overlaps with source area 344; and $f_{42}$=0.5 for the same reason. For macroblock $342_5$ (i.e., for i=5), there are four 8×8 sub-blocks. Suppose that these 8×8 sub-blocks are assigned j-index values from 1 to 4, in a clockwise order, starting from the upper-left sub-block, as indicated in FIG. 3C. Then, $f_{51}$=1 because 100% of the area of the upper-left 8×8 sub-block in macroblock $342_5$ overlaps with source area 344; and $f_{52}$=$f_{53}$=$f_{54}$=0 because none of the other 8×8 sub-blocks in macroblock $342_5$ overlap with source area 344.

Eq. (3) can also be applied to macroblocks that are inter-predicted using a single motion vector applied to the whole macroblock if the corresponding weighting coefficient $w_{ij}$ is set to one. Below, the term "inter-predicted block" is used to refer to either a macroblock or a sub-block that is inter-predicted at the original resolution using a single individual motion vector.

After average motion vector A for the source area has been calculated using Eqs. (1), (2), and/or (3), motion-vector-dispersion metric D can be calculated, e.g., using Eq. (4):

$$D = \frac{M^2}{N^2} \sum_{i,j} f_{ij} w_{ij} |v_{ij} - A|^2 \quad (4)$$

Eq. (4) is generally applicable to a transcoding configuration that is analogous to the transcoding configuration shown in FIGS. 3C-3D. For a transcoding configuration that is analogous to the transcoding configuration shown in FIG. 3B, Eq. (4) reduces to Eq. (5):

$$D = \frac{1}{N^2} \sum_{i=1}^{N^2} |\tilde{v}_i - A|^2 \quad (5)$$

Note that dispersion metric D calculated in accordance with Eq. (4) or Eq. (5) uses the Euclidean norm $E(x,y)$ of a two-dimensional vector $(x,y)$, which is expressed by Eq. (6):

$$E(x,y) \equiv |(x,y)| = \sqrt{x^2 + y^2} \quad (6)$$

One skilled in the art will understand that an alternative vector norm, such as the Manhattan norm or the p-norm, with an arbitrary p, can be used instead of the Euclidean norm in the dispersion-metric calculations without departing from the scope and principle of the invention.

At step 308 of method 300, the motion-vector-dispersion metric calculated at step 306 is compared with a threshold value (T). If the dispersion metric does not exceed the threshold value, then the processing of method 300 is directed to step 310. If the dispersion metric is greater than the threshold value, then the processing of method 300 is directed to step 312.

Threshold value T is a parameter that can be selected and, if necessary, adjusted, e.g., based on the video quality desired for output video bit-stream 232 (FIG. 2) and the available processing power in the host device. For example, the use of a relatively small T typically results in a relatively high output-video quality, but at the expense of a relatively high processor load. In contrast, the use of a relatively large T reduces the processor load, but may result in a relatively low output-video quality.

Figure 4A:
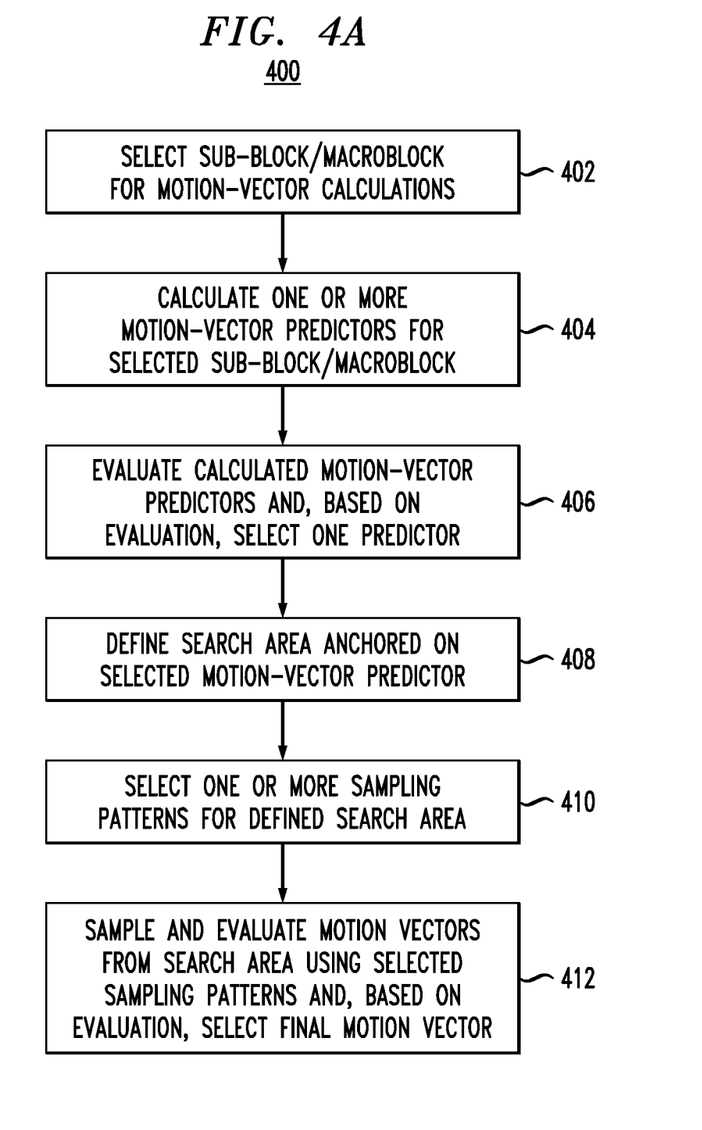
FIGS. 4A-B illustrate a motion-vector-search method that can be used in the video-encoding method of FIG. 3 according to one embodiment of the invention.
Figure 4B:
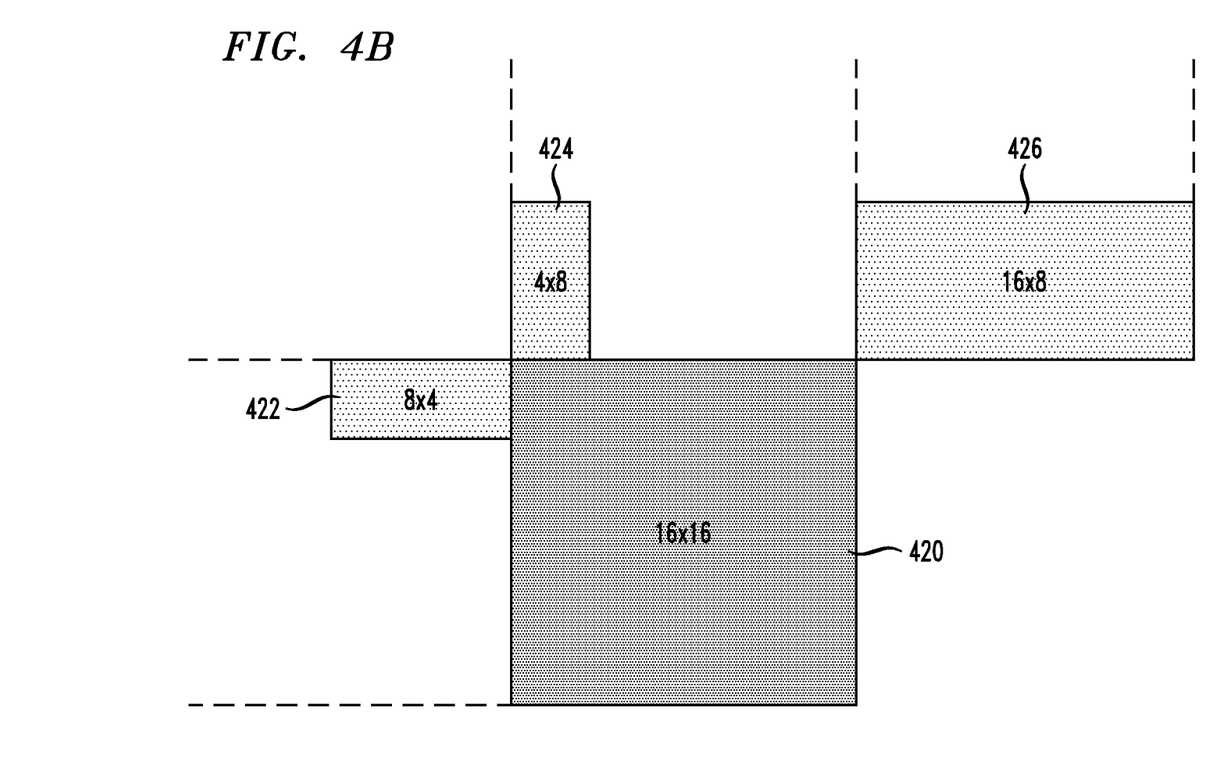

At step 310, the motion vector(s) for the target-resolution macroblock selected at step 302 is (are) determined based on one or more predicted motion vectors and, optionally, dispersion metric D calculated at step 306 and/or threshold value T. More specifically, a motion-vector search in the limited vector space around the predicted motion vector(s) is performed using a suitable search method. A representative method that can be used to implement the motion-vector search in step 310 is described below in reference to FIG. 4. After step 310, the processing of method 300 is directed back to step 302.

At step 312, the motion vector for the target-resolution macroblock selected at step 302 is determined using an exhaustive motion-vector search, e.g., as known in the art. After step 312, the processing of method 300 is directed back to step 302.

For practical reasons, an "exhaustive" search of step 312 may be performed over a vector space that is smaller than the motion-vector space corresponding to the entire frame. In this case, the following differences between steps 310 and 312 should be noted. One difference is that the search of step 310 is performed in relatively close vicinity of the predicted motion vector(s), whereas the search of step 312 may be centered around a zero vector corresponding to the center of a search box drawn around the macroblock. Another difference is that, even when the exhaustive search of step 312 is performed over a limited vector space, the search limits of step 310 are significantly narrower (e.g., by at least a factor of three or four) than the search limits of step 312. In addition, the search of step 310 may use (i) fewer search patterns and/or hierarchical search levels and (ii) more relaxed search-stopping criteria compared to those used in the search of step 312. In one embodiment, steps 310 and 312 are implemented using the same search algorithm, wherein the set of algorithm parameters used to configure the algorithm for step 310 differs from the set of algorithm parameters used to configure the algorithm for step 312.

FIGS. 4A-B illustrate a search method 400 that can be used at step 310 and/or step 312 of method 300 according to one embodiment of the invention. More specifically, FIG. 4A shows a flowchart of method 400. FIG. 4B pictorially shows the determination of a representative predicted motion vector that can be used at step 404 of method 400.

At step 402 of method 400, a sub-block of the macroblock selected at step 302 (FIG. 3A) is selected for motion-vector calculations. The sub-blocks can be selected in any desired order, e.g., consecutively, starting from the upper left corner of the macroblock and going in a predefined pattern toward the lower right or left corner of the macroblock. If the macroblock is not partitioned into sub-blocks, then the entire macroblock is selected for motion-vector-calculation purposes.

At step 404, one or more motion-vector predictors are calculated for the sub-block/macroblock selected at step 402. For example, one or more of the following motion-vector predictors may be used: (i) a median predictor; (ii) an upper-layer predictor; (iii) a spatial predictor; (iv) a temporal predictor; and (v) an accelerator predictor. Additional predictors of other known types may also be included. A zero vector (0,0) may optionally be added as an additional predictor. For brevity, only the calculation of a median predictor is explained below in reference to FIG. 4B. Representative calculations corresponding to other predictors are described, e.g., in U.S. Pat. Nos. 7,623,574, 7,023,921, 6,925,123, 6,891,891, and 6,825,885, all of which are incorporated herein by reference in their entirety.

FIG. 4B illustrates how median predictors can be calculated for a target-resolution macroblock 420. FIG. 4B assumes that macroblock 420 does not belong to the first row, first column, or last column of macroblocks in the target-resolution frame. The calculation of median predictors for a macroblock located in the first row, first column, or last column of macroblocks may rely on special rules, e.g., as described in the above-cited U.S. Pat. No. 7,616,692.

The calculation of median predictor(s) $P_j$ for macroblock 420 relies on the motion vectors of three previously coded macroblocks located directly to the left, directly above, and diagonally at the upper right corner, respectively, of macroblock 420. If any of these previously coded macroblocks is inter-predicted using two or more motion vectors corresponding to its sub-blocks, then the motion vectors of the sub-blocks may be used. For the macroblock located directly to the left of macroblock 420, the topmost sub-block adjacent to macroblock 420 is used. For the macroblock located above macroblock 420, the leftmost sub-block adjacent to macroblock 420 is used. For the macroblock located diagonally at the upper right corner of macroblock 420, the corner sub-block adjacent to macroblock 420 is used.

As an example, FIG. 4B shows a configuration in which all three previously coded macroblocks are inter-predicted using two or more respective motion vectors corresponding to their constituent sub-blocks. The relevant sub-block located to the left of macroblock 420 is an 8×4 sub-block 422. The relevant sub-block located above macroblock 420 is a 4×8 sub-block 424. The relevant sub-block located diagonally from macroblock 420 is a 16×8 sub-block 426.

Median predictor(s) $P_j$ for macroblock 420 can be calculated, e.g., as follows. If macroblock 420 is not partitioned into sub-blocks, then median predictor $P_0$ for the whole macroblock is calculated as the median of motion vectors corresponding to sub-blocks 422, 424, and 426. Note that each component of a median vector is the median of the corresponding components of the contributing vectors. If macroblock 420 is partitioned into sub-blocks other than two 16×8 sub-blocks or two 8×16 sub-blocks, then median predictor $P_j$ for the j-th sub-block is again the median of the motion vectors corresponding to sub-blocks 422, 424, and 426. If macroblock 420 is partitioned into two 16×8 sub-blocks, then median predictor $P_u$ for the upper 16×8 sub-block is the motion vector of sub-block 422, and median predictor $P_d$ for the lower 16×8 sub-block is the motion vector of sub-block 424. If macroblock 420 is partitioned into two 8×16 sub-blocks, then median predictor $P_l$ for the left 8×16 sub-block is the motion vector of sub-block 422, and median predictor $P_r$ for the right 8×16 sub-block is the motion vector of sub-block 426. If macroblock 420 is a skipped macroblock, then median predictor $P_0$ calculated as explained above is used.

At step 406 of method 400, the various predictors calculated at step 404 are evaluated, and one predictor that is judged to be the best predictor is selected. As used herein, the term "best predictor" refers to a predictor that produces the smallest sum of absolute differences (SAD) for the corresponding sub-block/macroblock. One skilled in the art will appreciate that an evaluation criterion different from SAD may alternatively be used to find the best predictor.

In one embodiment, the processing of method 400 is terminated after step 406, and the selected predictor is output as the final motion vector for the implicated sub-block/macroblock. In this case, at least two predictors need to be calculated at step 404. Then, the evaluation of these predictors performed at step 406 qualifies as a "motion-vector search" and is used in lieu of steps 408-412, which are omitted.

At step 408, the predictor selected at step 406 is used as an anchor for the definition of a search area within which the search for the final motion vector to be assigned to the implicated sub-block/macroblock is going to be conducted. In a representative implementation of step 408, the search area is a rectangle centered on the predictor. In mathematical terms, the search area can be expressed as follows: (1) the x range of the search area is $x_p \pm \Delta x$ and (2) the y range of the search area is $y_p \pm \Delta y$, where vector $P \equiv (x_p, y_p)$ is the predictor, and $\Delta x$ and $\Delta y$ are constants. If method 400 is used to implement step 312, then $\Delta x$ and $\Delta y$ are relatively large and do not depend on D or T. If method 400 is used to implement step 310, then $\Delta x$ and $\Delta y$ are relatively small and may depend on D and/or T. For example, in one implementation, $\Delta x = \alpha D$ and $\Delta y = \beta D$, where $\alpha$ and $\beta$ are constants. In another possible implementation, $\Delta x = \alpha T$ and $\Delta y = \beta T$.

At step 410, one or more sampling patterns are selected for the search area defined at step 408. The search patterns may be hierarchical in nature and may include one or more of a rectangular grid, a hexagonal grid, a diamond grid, an asymmetric cross, a square, a rectangle, a hexagon, and a diamond. As used herein, the term "hierarchical" means that the sampling patterns are arranged in a predetermined order, with the type, size, and/or position of a subsequent sampling pattern being dependent on or referenced to certain characteristics of the preceding sampling pattern.

At step 412, the motion vectors corresponding to the search area defined at step 408 are sampled and evaluated using the one or more sampling patterns selected at step 410. The evaluation may rely on any suitable evaluation criterion, such as the SAD. A motion vector sample that is judged to be the best sample (e.g., producing the smallest SAD) is selected as the final motion vector. Conventional thresholding may be employed to stop the sampling and evaluation process of step 412 before all motion-vector samples corresponding to the selected sampling pattern(s) have been evaluated. For example, the sampling and evaluation process can stop when, based on the comparison of the evaluation-criterion value with the applicable threshold value, the most-recently sampled motion vector is deemed acceptable as the final motion vector.

In a representative embodiment, method 400 can be implemented by appropriately modifying a fast full search (FFS) method, a UMHS (Unsymmetrical-cross Multi-Hexagon-grid Search) method, or an EPZS (enhanced predictive zonal search) method. Additional information on these methods can be found, e.g., in the following publications: (1) C. Zhu, X. Lin, and L. P. Chau, "Hexagon-Based Search Pattern for Fast Block Motion Estimation," IEEE Transactions on Circuits and Systems for Video Technology, vol. 12, pp. 349-355, May 2002; (2) Alexis M. Tourapis, "Enhanced Predictive Zonal Search for Single and Multiple Frame Motion Estimation," XiWave plc, Bath, BA1 2PH, United Kingdom; (3) Yap-Peng Tan, Haiwei Sun, and Yong Qing Liang, "On the Methods and Applications of Arbitrarily Downsizing Video Transcoding," School of Electrical & Electronic Engineering, Nanyang Technological University, Singapore, IEEE 2002; (4) H.264/AVC Software Coordination, H.264/AVC JM 14.2 Reference Software Documentation (http://iphome.hhi.de/suehring/tml/); and (5) Y.-C. Lin and S.-C. Tai, "Fast Full-Search Block-Matching Algorithm for Motion-Compensated Video Compression," IEEE Transactions on Communications, Vol. 45, No. 5, May 1997, all of which are incorporated herein by reference in their entirety. Method 400 may also be supplemented, as known in the art, by motion-vector refinement to a fractional-pixel resolution.

While this invention has been described with reference to illustrative embodiments, this description is not intended to be construed in a limiting sense. For example, different motion-vector search algorithms can be used at steps 310 and 312 of method 300 (FIG. 3A). Although the calculation of motion-vector dispersion metric has been described as being performed with respect to the average motion vector, a mean motion vector or a median motion vector can also be used instead of the average motion vector in dispersion-metric calculations. Macroblock and sub-block sizes and partitioning schemes that are different from those used in the description of the figures are also contemplated. Various modifications of the described embodiments, as well as other embodiments of the invention, which are apparent to persons skilled in the art to which the invention pertains are deemed to lie within the principle and scope of the invention as expressed in the following claims.

As known in the art, the term "spatial resolution" generally refers to the amount of detail that an image holds. Higher spatial resolution typically corresponds to more image detail. Image resolution can be measured in various ways. For example, image resolution can be used to quantify how close two lines can be to each other to still be perceived as separate lines in the image. Resolution units can be tied to physical sizes (e.g., lines per inch), to the overall size of a picture (e.g., lines or pixels per height/width of the picture), or to angular subtenant. Line pairs are often used instead of lines, with a line pair comprising a dark line and an adjacent light line. In television, a resolution of ten lines per millimeter means five dark lines alternating with five light lines per millimeter. In digital imaging, resolution is usually tied to the pixel count in an image. More specifically, it is often said that an image has a vertical resolution of Y pixels and a horizontal resolution of X pixels, e.g., 640×480 pixels. Another popular convention is to cite resolution as the total number of pixels in the image, which is calculated by multiplying the number of pixel columns by the number of pixel rows. Other conventions include describing resolution in pixels per length unit or pixels per area unit, such as pixels per inch or pixels per square inch.

The present inventions may be embodied in other specific apparatus and/or methods. The described embodiments are to be considered in all respects as only illustrative and not restrictive. In particular, the scope of the invention is indicated by the appended claims rather than by the description and figures herein. All changes that come within the meaning and range of equivalency of the claims are to be embraced within their scope.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they formally fall within the scope of the claims.

A person of ordinary skill in the art would readily recognize that steps of various above-described methods can be performed by programmed computers/processors. Herein, some embodiments are intended to cover program storage devices, e.g., digital data storage media, which are machine or computer readable and encode machine-executable or computer-executable programs of instructions where said instructions perform some or all of the steps of methods described herein. The program storage devices may be, e.g., digital memories, magnetic storage media, such as magnetic disks or tapes, hard drives, or optically readable digital data storage media.

The functions of the various elements shown in the figures, including any functional blocks labeled as "processors," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A method of resizing digital video, the method comprising:
   converting a source area in a first video frame having a first spatial resolution into a macroblock in a corresponding second video frame having a second spatial resolution smaller than the first spatial resolution;
   calculating a dispersion metric for a set of motion vectors corresponding to the source area at the first spatial resolution; and
   performing a motion-vector search configured based on the dispersion metric to find a motion vector for the macroblock at the second spatial resolution.

2. The method of claim 1, wherein the step of performing comprises:
   comparing the dispersion metric with a threshold value;
   executing, if the dispersion metric is smaller than the threshold value, a first search algorithm to find the motion vector for the macroblock at the second spatial resolution; and executing, if the dispersion metric is greater than the threshold value, a second search algorithm to find the motion vector for the macroblock at the second spatial resolution, wherein the second search algorithm is different from the first search algorithm, and both the first search algorithm and the second search algorithm are configured for the second spatial resolution.

3. The method of claim 1, wherein the step of performing comprises:
comparing the dispersion metric with a threshold value;
if the dispersion metric is smaller than the threshold value, then selecting a first set of configuration parameters for a search algorithm; and
executing the search algorithm with the first set of configuration parameters to find the motion vector for the macroblock at the second spatial resolution; and
if the dispersion metric is greater than the threshold value, then
selecting a second set of configuration parameters for the search algorithm, wherein the second set is different form the first set; and
executing the search algorithm with the second set of configuration parameters to find the motion vector for the macroblock at the second spatial resolution, wherein, both with the first set of configuration parameters and with the second set of configuration parameters, the search algorithm is configured for the second spatial resolution.

4. The method of claim 1, further comprising:
calculating a predicted motion vector for the macroblock at the second spatial resolution; and
defining a search area for the motion-vector search at the second spatial resolution based on the predicted motion vector, wherein the search area for the motion-vector search at the second spatial resolution has a size that depends on the dispersion metric calculated at the first spatial resolution.

5. The method of claim 4, wherein the size is proportional to the dispersion metric calculated at the first spatial resolution.

6. The method of claim 1, wherein the step of calculating comprises:
calculating an average motion vector for the source area at the first spatial resolution;
for each inter-predicted block that at least partially overlaps with the source area at the first spatial resolution, calculating a difference between a respective individual motion vector and the average motion vector; and
calculating the dispersion metric based on said differences at the first spatial resolution.

7. The method of claim 6, wherein the dispersion metric is calculated at the first spatial resolution by weighting each of said differences using at least one of:
a first weighting coefficient w that represents the fraction of the total area occupied by the inter-predicted block in a corresponding macroblock; and
a second weighting coefficient f that represents the fraction of the total area of the inter-predicted block that overlaps with the source area.

8. The method of claim 1, wherein the source area consists of a plurality of whole macroblocks.

9. The method of claim 1, wherein the source area comprises one or more whole macroblocks and one or more macroblock portions that do not belong to said one or more whole macroblocks.

10. The method of claim 1, wherein the step of performing comprises:
selecting a sub-block in the macroblock at the second spatial resolution; and
calculating one or more motion-vector predictors for the selected sub-block at the second spatial resolution, wherein said one or more motion-vector predictors are selected from a group consisting of a median predictor, an upper-layer predictor, a spatial predictor, a temporal predictor, and an accelerator predictor.

11. The method of claim 10, wherein the step of performing further comprises:
evaluating the one or more calculated motion-vector predictors based on SAD calculations at the second spatial resolution; and
selecting one motion-vector predictor that produces a smallest SAD value for the sub-block at the second spatial resolution.

12. The method of claim 11, wherein the selected one motion-vector predictor is used as a final motion vector for inter-prediction coding at the second spatial resolution.

13. The method of claim 10, wherein the step of performing further comprises:
defining a search area around a selected one of the calculated one or more motion-vector predictors at the second spatial resolution;
selecting one or more sampling patterns for the defined search area;
sampling motion vectors from the defined search area using the selected one or more sampling patterns; and
selecting from the sampled motion vectors a motion vector that produces a smallest SAD value for the sub-block at the second spatial resolution.

14. The method of claim 1, wherein the method is implemented in a video transcoder.

15. A video transcoder, comprising:
a decoder adapted to decode an encoded video bit-stream to produce a first video frame having a first spatial resolution;
a downsizer adapted to convert the first video frame into a corresponding second video frame having a second spatial resolution smaller than the first spatial resolution, wherein a source area from the first video frame is converted into a macroblock in the second video frame; and
an encoder adapted to apply inter-prediction coding to the macroblock, wherein:
a dispersion metric is calculated for a set of motion vectors corresponding to the source area at the first spatial resolution; and
a motion-vector search configured based on the dispersion metric is performed to find a motion vector for the macroblock at the second spatial resolution.

16. The video transcoder of claim 15, wherein:
the encoder is adapted to compare the dispersion metric with a threshold value;
if the dispersion metric is smaller than the threshold value, then the encoder is configured to execute a first search algorithm to find the motion vector for the macroblock at the second spatial resolution; and
if the dispersion metric is greater than the threshold value, then the encoder is configured to execute a second search algorithm to find the motion vector for the macroblock at the second spatial resolution, wherein the second search algorithm is different from the first search algorithm, and both the first search algorithm and the second search algorithm are configured for the second spatial resolution.

17. The video transcoder of claim 15, wherein:

the encoder is adapted to compare the dispersion metric with a threshold value;

if the dispersion metric is smaller than the threshold value, then the encoder is configured to execute a search algorithm with a first set of configuration parameters to find the motion vector for the macroblock at the second spatial resolution; and if the dispersion metric is greater than the threshold value, then the encoder is configured to execute the search algorithm with a second set of configuration parameters to find the motion vector for the macroblock at the second spatial resolution, wherein:

the second set is different form the first set; and both with the first set of configuration parameters and with the second set of configuration parameters, the search algorithm is configured for the second spatial resolution.

18. The video transcoder of claim 15, wherein the encoder is configured to:

calculate a predicted motion vector for the macroblock at the second spatial resolution; and define a search area for the motion-vector search at the second spatial resolution based on the predicted motion vector, wherein the search area has a size that depends on the dispersion metric calculated at the first spatial resolution.

19. The video transcoder of claim 18, wherein the size is proportional to the dispersion metric calculated at the first spatial resolution.

20. A video transcoder, comprising:

means for converting a source area in a first video frame having a first spatial resolution into a macroblock in a corresponding second video frame having a second spatial resolution smaller than the first spatial resolution;

means for calculating a dispersion metric for a set of motion vectors corresponding to the source area at the first spatial resolution; and means for performing a motion-vector search configured based on the dispersion metric to find a motion vector for the macroblock at the second spatial resolution.

21. The method of claim 1, wherein:

the first video frame represents an image at the first spatial resolution; and the second video frame represents said image at the second spatial resolution and is generated from the first video frame by applying thereto a planar image-size transformation from the first spatial resolution to the second spatial resolution.

\* \* \* \* \*